United States Patent [19]

Mode

[11] 4,440,424
[45] Apr. 3, 1984

[54] RELEASABLE COUPLING DEVICE

[75] Inventor: Paul Mode, Westfield, N.J.

[73] Assignee: Nycoil Corporation, Fanwood, N.J.

[21] Appl. No.: 912,003

[22] Filed: Jun. 2, 1978

[51] Int. Cl.³ .......................................... F16L 21/06
[52] U.S. Cl. .................................. 285/39; 285/238;
285/340; 285/322
[58] Field of Search ................ 285/39, 323, 319, 340,
285/DIG. 22, 322, 328, 238

[56] References Cited

U.S. PATENT DOCUMENTS

| | | | |
|---|---|---|---|
| 2,134,719 | 11/1938 | Kocher | 285/39 |
| 2,465,197 | 3/1949 | Chatham | |
| 2,635,901 | 4/1953 | Osborn | |
| 3,019,284 | 1/1962 | Matthysse | |
| 3,440,852 | 4/1969 | Heath | 72/368 X |
| 3,831,954 | 8/1974 | Longfellow | 285/27 X |
| 3,858,913 | 1/1975 | Gallagher | 285/319 X |
| 3,879,065 | 4/1975 | Kobayashi | |
| 3,909,046 | 9/1975 | Legris | 285/39 |
| 3,924,882 | 12/1975 | Ellis | 285/340 X |
| 4,005,883 | 2/1977 | Guest | 285/322 |
| 4,021,062 | 5/1977 | Mariaulle | 285/39 |
| 4,073,514 | 2/1978 | Pate | 285/340 X |
| 4,123,090 | 10/1978 | Kotsakis et al. | 285/39 |
| 4,240,651 | 12/1980 | Mariaulle | 285/39 |

FOREIGN PATENT DOCUMENTS

| | | | |
|---|---|---|---|
| 1474023 | 2/1967 | France | |
| 1542634 | 9/1968 | France | |
| 2368663 | 5/1978 | France | 285/39 |

OTHER PUBLICATIONS

Parker Connecteurs, Catalogue 0019F, 3 pp., May 1978.

*Primary Examiner*—Thomas F. Callaghan
*Attorney, Agent, or Firm*—Lerner, David, Littenberg, Krumholz & Mentlik

[57] ABSTRACT

An improved releasable coupling device for a tube is disclosed. The coupling device comprises a fitting having a bore therein and an opening into the bore through which the tube is to be inserted, a retaining ring disposed in the opening and having a plurality of axially extending inwardly biased fingers, and an unlocking collar positioned inside of the retaining ring in the opening. The inwardly biased fingers of the retaining ring each have a gripping portion adapted to engage the tube when the tube is inserted into the fitting towards the bore so that the tube is restrained against axial movement out of the fitting. The unlocking collar is axially movable relative to the retaining ring for direct engagement with the fingers upon axial movement towards the fingers to force the fingers radially outward to cause disengagement of the gripping portions from the tube. The unlocking collar includes an actuating surface which is accessible from outside of the opening for applying force to move the unlocking collar axially. Sealing means are also provided for sealing the tube in the fitting, the sealing means being positioned axially between the gripping portions of the fingers and the end of the opening adjacent the exterior of the fitting. There is also disclosed an improved retaining ring for the coupling device and a method of manufacturing same.

8 Claims, 14 Drawing Figures

RELEASABLE COUPLING DEVICE

BACKGROUND OF THE INVENTION

The present invention relates to coupling assemblies for conduits or tubes used to carry fluid (e.g., liquid, air, gas, etc.), and more particularly, to releasable coupling devices by which the tube or conduit inserted into the coupling device may be disengaged and withdrawn therefrom. Such coupling devices are particularly useful in hydraulic or pneumatic equipment for automatic operation, the coupling devices being used to make either joints between two tubes or conduits, or joints between tubes and the pneumatic or hydraulic component part of such equipment.

Releasable coupling devices are generally known in the art. Such known devices generally comprise a coupling member having a bore into which a conduit or tube to be connected or coupled thereto is introduced and held thereinplace by action of gripping teeth of a retaining element which is inserted in the radial gap between the bore and the tube. An unlocking member is generally provided which is adapted to release the gripping action of the teeth. The known devices also generally include a packing ring for sealing the bore and the conduit or tube inserted thereinto to prevent leakage of fluid between the coupling member and the conduit or tube coupled thereto.

In many of the prior art devices, the sealing or packing ring is disposed below the elevation of the gripping fingers, i.e., between the end of the bore at the interior of the coupling member and the end of the gripping fingers. For example, such an arrangement is shown in U.S. Pat. No. 3,909,046 for "Connector For Fluid Conduits, Such as Semi-Rigid Pipes", issued Sept. 30, 1975 to Legris. Since such packing or O-rings normally comprise a hard rubber material, and since the gripping fingers of such devices have serrations or pointed tips which, upon insertion of the tube or conduit, cause the exterior surface of the tube to be scratched or marred, the hard rubber O-rings may not serve to adequately seal and prevent leakage of fluid from the interior of the coupling body around the exterior of the tube, i.e., along the serrated portion of the exterior surface of the tube. In other words, because of the composition of the materials used, an adequate seal may not be provided by the O-ring, since the O-ring may not deform to a sufficient extent to fill the grooves in the outer surface of the tube caused by gripping fingers upon insertion of the tube. It is to be noted that such tubes for these coupling devices are often made of a semi-rigid plastic which is easily marred by the tips of gripping fingers which are generally metallic, such as brass, etc. As can be appreciated, such an arrangement is disadvantageous where it is desired to prevent any leakage. Further, the device of the Legris patent has been found to unexpectedly unlock or release the tube from gripping engagement as a result of vibrations when the fluid pressure is low.

Another prior art coupling assembly is disclosed in U.S. Pat. No. 4,021,062, for "Coupling Assemblies", issued May 3, 1977, to Mariaulle. There, a coupling assembly is adapted to be inserted and cemented in place in a bore of a fitting for coupling a tube to the fitting. The coupling assembly comprises a retaining ring having a plurality of gripping fingers inwardly biased and an unlocking ring between the retaining ring and the conduit or tube to be inserted therethrough. The unlocking ring is operable, on being pushed axially, to spread the gripping teeth of the retaining ring to release the tube or conduit. Two generally different sealing embodiments are disclosed in that patent. One embodiment, like that of the Legris patent, has the sealing O-ring disposed below the gripping fingers, and accordingly, is subject to the same limitations and disadvantages discussed above with respect to Legris—namely, the possibility of not providing a complete and adequate seal since the hard packing ring may be incapable of filling in grooves or serrations on the outer surface of the conduit caused by the gripping fingers upon insertion of the conduit. The other sealing embodiment of the Mariaulle patent discloses the fluid tight packing O-ring being interposed either between the unlocking ring and the gripping fingers or between adjacent halves of the unlocking ring so that the axial unlocking force is transmitted through the packing ring. Accordingly, the axial unlocking force must be greater than is normally necessary to cause unlocking of the gripping fingers since part of the force is dissipated in or absorbed by the non-rigid, deformable packing ring. Thus, this sealing arrangement also is disadvantageous as it is more difficult to cause disengagement of the gripping fingers from the conduit or tube. Furthermore, in the Mariaulle patent, the coupling assembly is relatively more expensive to manufacture since it first requires sub-assembly at the manufacturing location and then a second operation for fixably securing the assembly in a coupling member having the bore. Further, cementing of the coupling assembly into the fitting has been found to be inadequate sealing of the tube.

Turning to another aspect of the prior art, metallic retaining rings for releasable coupling devices which have downwardly depending inwardly biased gripping fingers have generally been manufactured by first forming a cup-shaped member from a metallic plate, such as for example, by drawing or bending of the metal. Then, the bottom of the cup and portions of the side are cut out to define a plurality of gripping fingers depending from a completely closed ring-shaped member. The formed gripping fingers can be biased further inwardly, such as by bending, or, if the cup-shaped member initially has inclined sides, the formed gripping teeth may be sufficiently inclined without further bending to provide inwardly biased gripping fingers. As can be appreciated, there is a substantial amount of waste which results from such prior art manufacturing methods. For example, it has been found that such methods have resulted in waste amounting to 75% of the weight of the metal from which the cup-shaped member is initially formed. This quantity of waste is quite significant, especially when metals such as brass are utilized to manufacture the metallic retaining rings.

SUMMARY OF THE INVENTION

In accordance with one aspect of the present invention, the improved releasable coupling device for a fluid conduit or tube comprises a fitting having a bore therein and an opening into the bore through which the tube is to be inserted, a retaining ring disposed in the opening and having a plurality of axially extending inwardly biased fingers, an unlocking collar positioned inside of the retaining ring in the opening of the fitting, and sealing means in the opening. The internal diameter of the opening is greater than the diameter of the bore and the opening has a first end adjacent to the bore and a second end open to the exterior of the fitting. Each of the fingers of the retaining ring is provided with a gripping portion which is adapted to engage the tube when the tube is inserted into the fitting towards the bore so that the tube is restrained against axial movement out of the fitting. The unlocking collar is axially movable relative to the retaining ring for direct engagement with the fingers upon axial movement toward the fingers to force the plurality of fingers radially outward to cause disengagement of the gripping portions from the tube. The unlocking collar is also provided with an actuating surface accessible from the outside of the opening for applying force to move the unlocking collar axially. The sealing means is positioned axially between the gripping portions of the fingers and second end of the opening for sealing of the tube and the fitting.

With such an arrangement, the problem of providing adequate sealing of the serrations or grooves on the outside of the tube caused upon insertion into the fitting is avoided since the sealing means is positioned above the gripping portions of the fingers, and thus above the elevation of the serrations. At the same time, the unlocking collar is adapted to directly engage the fingers to move same radially outward to cause disengagement of the gripping portions from the tube, thereby avoiding the problems of the prior art of the sealing means absorbing part of the unlocking force.

In the preferred embodiment, the sealing means comprises a fluid tight packing ring fitted in the opening above the retaining ring between the inside wall of the opening and the outside wall of the unlocking collar, and a dimple or bead around the inside circumference of the unlocking collar which is adapted to engage the outside surface of the tube which is inserted into the opening of the fitting.

According to another aspect of the present invention, there is provided an improved retaining ring for a releasable coupling device for a tube, the coupling device being of the type including a fitting having a bore therein, and an opening into the bore through which the tube is to be inserted, the internal diameter of the opening being greater than the diameter of the bore, a retaining ring in the opening having a plurality of axially extending, inwardly biased fingers adapted to engage the tube when the tube is inserted into the fitting towards the bore so that the tube is restrained against axial movement out of the fitting, and unlocking means for forcing the plurality of fingers of the retaining ring radially outward to cause disengagement of the fingers from the tube. The improved retaining ring comprises a multi-sided web portion having a plurality of fingers depending therefrom and in which the adjacent sides of the web portion define a plurality of corners. The retaining ring is such that the diameter of an imaginary circle passing through the corners is greater than the diameter of the opening in the fitting and the diameter of the imaginary circle passing through the mid-point of the sides of the web portion is less than the diameter of the opening. In this way, the retaining ring may be supported solely in the opening of the fitting by the engagement of the corners against the side wall of the opening when the retaining ring is inserted into the opening. Thus, it is not necessary to machine a shoulder in the opening of the fitting for supporting the retaining ring, and accordingly, the opening may be of a simpler design which is easier to manufacture as there are less cutting and maching operations necessary.

According to a still further aspect of the present invention, there is disclosed a method of manufacturing a metallic retaining ring for a tube in which the retaining ring is provided with a plurality of axially extending inwardly biased gripping fingers. According to the method of the present invention, a flat metallic plate is first cut to form a flat web portion and a plurality of substantially parallel, elongated fingers depending from and integral with such flat web portion. Then, the elongated fingers are bent out of the plane of the web portions so that at least a portion of each of the fingers is inclined with respect to the surface of the web portion. Finally, the web portion is bent around a substantially circular form so that the web portion forms a substantially closed circle and the inclined portions of the fingers are directed inwardly relative to the circular shaped web portion to produce the retaining ring.

These and further features and characteristics of the present invention will be apparent from the following detailed description in which reference is made to the enclosed drawings which illustrates the preferred embodiments of the present invention.

DETAILED DESCRIPTION OF THE INVENTION

First, it should be noted that the coupling assembly of the present invention is particularly useful for coupling a tube or conduit of all types of plastic, and accordingly, the present invention will be described with reference to such a tube or conduit. However, it should be understood that copper or aluminum tubes or pipes could just as easily be used with the coupling device of the present invention. In addition, it is to be noted that the present invention is particularly useful for coupling of conduits or tubes for use in hydraulic or pneumatic equipment for automatic operations in which the coupling device provides a joint between two tubes or conduits, or a joint between a tube and the pneumatic or hydraulic component parts of the equipment. However, this is by no means the only purposes for which the present invention can be used.

Figure 1:
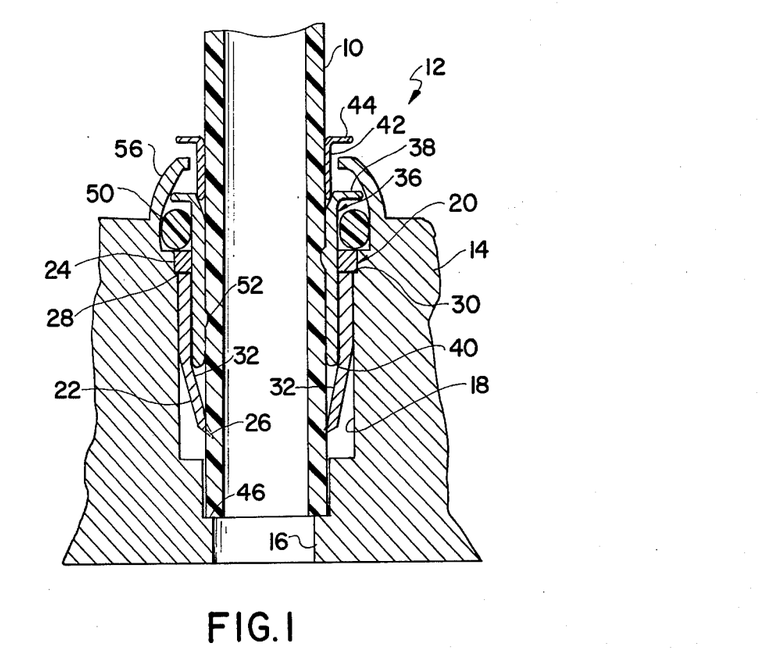
FIG. 1 is a longitudinal sectional view of one embodiment of the coupling device of the present invention with the tube inserted therein.

With the above in mind, reference is first made to FIG. 1 in which there is shown a conduit 10 of semi-rigid plastic coupled or connected to one embodiment of the coupling device 12 of the present invention. The coupling device 12 includes a fitting or body 14 of suitable material, which is adapted to be connected, in a suitable fashion, to either another conduit or to a component part of pneumatic or hydraulic equipment in connection with which the present invention is used. Such other connections are well known and need not be further described, although, it is to be noted that if the fitting 14, at the other end, is to be connected to a similar tube or conduit as tube 10, the other end of the fitting 14 could be similarly arranged and provided with similar components as the end shown in FIG. 1.

As shown in FIG. 1, the fitting 14 is provided with a fluid communication bore 16 which provides fluid communication to the other end of the fitting 14. An opening 18 is provided from the exterior of the fitting 14 into the bore 16. In the embodiment shown in FIG. 1, the opening 18 comprises a series of concentrically arranged bores of progressively larger diameters in a direction toward the exterior or top of the fitting 14. While such an arrangement is convenient for providing stops or shoulders for the various components to be inserted therein, the present invention only requires an opening 18 of larger diameter than the fluid communication bore 16 for housing the various other components of the coupling device, to be described in further detail hereinbelow.

In the opening 18, there is first inserted a retaining ring 20 having a plurality of downwardly or axially extending fingers 22, which are circumferentially arranged and supported by a continuous cylindrical ring portion 24. The lower ends of each of the fingers 22, which in the embodiment depicted in FIG. 1 are four (4) in number, are normally biased radially inwardly toward one another. The lower extremities of the fingers 22 are each provided with gripping portions 26 adapted to engage the plastic tube 10 upon insertion of same into the fitting opening 18 toward the bore 16. For this purpose, the inside diameter defined by the gripping portions 26 is of a lesser dimension than the outside diameter of the tube or conduit 10. The fingers 22 and gripping portions 26 may take on any form which is suitable for this purpose, and in the embodiment shown in FIG. 1 are shown to have a pointed tip 26 which is directed slightly in a downward direction. This is advantageous for preventing withdrawal of the tube 10 once same has been inserted unless the gripping portions 26 of fingers 22 are moved radially outward of gripping engagement.

It is to be noted that intermediate the cylindrical ring portion 24 and the gripping portions 26, the fingers 22 are each provided with an inwardly inclined inner surface 32. As will be more fully described hereinbelow, the surface 32 is particularly useful and advantageous for the purpose of transmitting an axially directed unlocking force to provide radially outward movement of the lower ends of the fingers 22 to release the tube or conduit 10 from gripping engagement.

Also in the embodiment shown in FIG. 1, the cylindrical ring portion 24 of the retaining ring 20 is provided with a downwardly directed shoulder 28, adapted to rest on a complementary shoulder 30 formed in the opening 18. These complementary shoulders 28 and 30 serve to support the retaining ring 20 in the opening 18 and limit downward movement thereof toward the bore 16.

The coupling device 12 also includes an unlocking collar 36 which is positioned inside of the retaining ring 20 within the opening 18. The unlocking collar 36 is generally cylindrically shaped and has an outwardly directed flange 38 at its upper end. The outer diameter of the collar 36 is of lesser dimension than the inner diameter of the cylindrical portion 24 of the retaining ring 20 so that the unlocking collar 36 may be freely movable axially relative to the retaining ring 20. The lower end surface 40 of the unlocking collar 36 is rounded or beveled so that, upon axial movement downwardly of the unlocking collar 36, such lower end surface 40 will smoothly engage the inclined surface 32 of the gripping fingers 22 and bias same radially outward to release the tube 10 from engagement by the gripping fingers 22, and thus from the fitting 14.

At the upper end of the unlocking collar 36, a force actuating ring 42 is force fitted into the upper end of the unlocking collar. The outside diameter of the force actuating ring 42 is slightly greater than the inside diameter of the unlocking collar 36 so that the outside surface of the actuating ring 42 tightly engages the inside surface of the unlocking collar 36. At the lower end of the actuating ring 42, the outside surface may be slightly tapered to allow for initial insertion of same into the unlocking collar 36, or, alternatively, the inside surface of the unlocking collar 36 may be slightly tapered radially outward to allow for such insertion. In any event, upon quickly jamming together of the two components 36, 42, a suitably tight force fit is achieved so that the force actuating ring 42 and the unlocking collar 36 may be moved axially as a unit. The upper end of the force actuating ring 42 is provided with outwardly directed flange 44 to provide a suitable surface on which a downward directed axial force can be imposed, which force is transmitted directly to the unlocking collar 36 to move same axially downward to bias the gripping fingers 22 radially outward, as described hereinabove. It will also be noted that the inside diameter of both the unlocking collar 36 and the force actuating ring 42 is of a larger dimension than the outside diameter of the tube or conduit 10 to allow for insertion of the tube 10 into the opening 18.

A shoulder 46 is provided at the entrance to the bore 16 to provide a stop for the tube 10 upon insertion downwardly into the opening 18 in a direction toward the bore 16. This stop shoulder 46 is positioned axially below the gripping portion 26 of the fingers 22 so that the tube 10 will be inserted far enough into the opening 18 that it will be restrained against axial movement out of the opening 18. As noted above, this shoulder 46 is not necessary for operation of the present invention, but merely provides a convenient means for indicating and insuring that the tube 10 will be gripped by the fingers 22.

To provide adequate sealing between the bore 16 and the exterior of the tube 10 to insure a fluid tight connection, a double seal arrangement is provided by the present invention. This double seal arrangement comprises a fluid tight packing ring 50 between the wall of the opening 18 and the outside cylindrical surface of the unlocking collar 36, and a dimple or raised bead portion 52 on the inside surface of the unlocking collar 36 which engages the outside of the tube 10. The fluid tight packing ring 50 is generally made of a hard rubber material and serves to seal against leakage between the wall of the opening 18 and the unlocking collar 36. The raised dimple 52 on the inside surface of the unlocking collar 36 on the other hand, serves to seal against leakage between the unlocking collar 36 and the outside surface of the tube 10. Thus, fluid conducted between the bore 16 and the interior of the tube 10 is prevented from leaking around the outside of the tube 10 through the opening 18.

Figure 2:
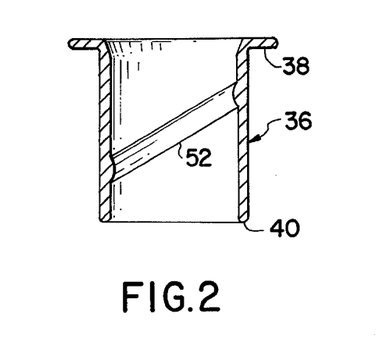
FIG. 2 is a longitudinal sectional view of the unlocking collar of the coupling device of FIG. 1 showing the sealing dimple around the inside circumference thereof.

The raised dimple 52 on the inside surface of the unlocking collar 36, as best seen in FIGS. 1 and 2, comprises a circumferential continuous indented ring or dimple around the inside surface of the unlocking collar 36. The dimple 52, upon insertion of the tube 10, serves to deform slightly the outside surface of the tube 10 to provide a fluid tight seal. This is possible due to the nature of the hard plastic material from which the tube 10 is formed. Because the dimple is relatively smooth, being of a substantially arcuate cross section, no permanent marring or deformation on the surface of the tube 10 will occur.

As can be appreciated, if the amount of indentation on the dimple 52 is too great, insertion of the tube 10 therethrough will be difficult, requiring a relatively great force and/or the tube might be permanently deformed. On the other hand, the amount of indentation must be of a sufficient dimension to insure that in fact the outside surface of the tube 10 is always engaged about the entire circumference to provide a suitable seal. Thus, the tolerance in the outside dimension of the tube 10 and the inside dimension of the dimple 52 must be held very close to achieve both of the competing considerations of ease of insertion of the tube 10 and prevention of leakage between the collar 36 and the outside surface of the tube 10. To alleviate this requirement, the dimple 52 has been offset in the embodiment shown in FIGS. 1 and 2—that is, the axial position of the indentation relative to the unlocking collar 36 varies about the circumference of the unlocking collar 36. In this manner, the tube 10 can be "snaked" through the area of the dimple 52 of the unlocking collar 36 as the tube is inserted. In other words, upon insertion of the tube 10, the tube 10 does not experience the full effect of the reduced diameter of the dimple 52 at any one axial position but instead encounters the dimple 52 over a range. Simply stated, the tube 10 may be moved and twisted, and in the sense guided, through the reduced diameter portion of the dimple 52 of the unlocking collar 36 upon insertion into the fitting 14. In this way, the tolerances which are to be maintained on the outside diameter of the tube 10 and the inside diameter of the dimple of the unlocking collar can be relaxed.

It is to be noted that the fluid tight packing ring 50 is located above the elevation of the retaining ring 20 and provides a fluid tight seal between the smooth inner wall of the opening 18 at such axial position and the smooth outer wall of the unlocking collar 36. This fluid tight seal is maintained despite any axial movement of the unlocking collar 36 to disengage the gripping portions 26 from the surface of the conduit 10. Further, it is to be noted that the axial position of the dimple 52 of the unlocking collar 36 is always maintained above the axial position of the gripping portions 26 of the fingers 22 so that grooves, marring, etc., formed on the outside surface of the tube 10 as tube 10 is forced past the gripping portions 26 do not affect the seal provided by the dimple 52, or the seal provided by the O-ring 50.

While in the embodiment shown in FIG. 1, the tube 10 is made of a plastic type material (i.e., hard plastic, semi-rigid plastic, or soft plastic) to allow for deformation as the tube is inserted pass the dimple 52 of the unlocking collar 36, and the unlocking collar 36 is made of metal, in practice, the tube 10 may be metal in which case it would be desirable to use a plastic type material for the unlocking collar 36. Then, it would be the dimple 52 which is slightly deformed upon insertion of the tube 10 as opposed to the outside surface of the the tube 10.

The upper end of the opening 18 of the fitting 14 is initially provided with an upwardly extending collar 56 to allow for insertion into the opening 18 of the retaining ring 20, the O-ring 50, and the unlocking collar 36. The assembly in the opening 18 is accomplished by first inserting the retaining ring 20 so that the downwardly directed shoulder 28 of the cylindrical ring portion 24 rests on the upwardly directed shoulder 30 of the opening 18. Then, the O-ring 50 is inserted above the cylindrical ring portion 24 and the unlocking collar 36, with the actuating ring 42 joined thereto, is inserted inside of the O-ring 50 and retaining ring 20. The outwardly directed flange 38 on the unlocking collar 36 serves to hold the O-ring 50 in place in the opening 18, and further to insure that a seal is provided at all times between the wall of the opening 18 and the outside surface of the unlocking collar 36. After insertion of these components, the collar 56 of the fitting 14 is swaged inwardly and downwardly to provide a blocking type relationship with respect to the components within the opening 18. It will be noted, with reference to FIG. 1, that the upper flange 44 of the force actuating ring 42 is axially positioned above the swaged collar 56.

Figure 3:
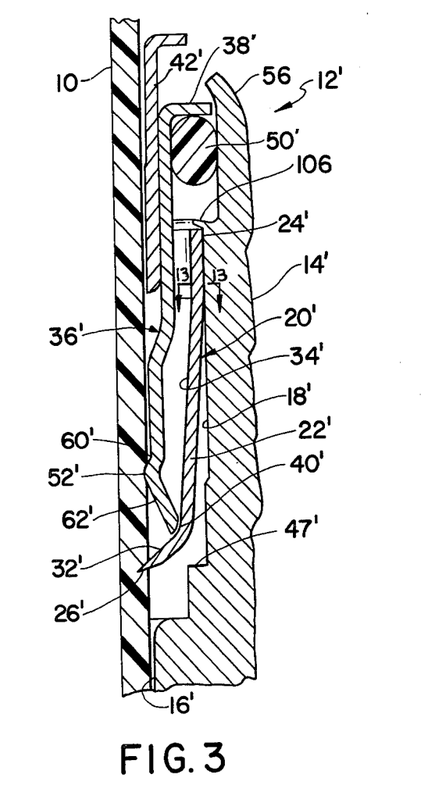
FIG. 3 is a longitudinal sectional view of a portion of another embodiment of the coupling device of the present invention with the tube inserted therein.
Figure 4:
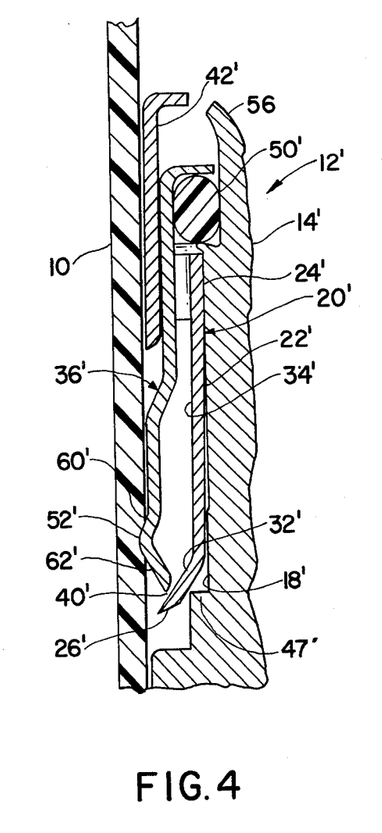
FIG. 4 is a longitudinal sectional view of a portion of the coupling device and tube shown in FIG. 3, but with the gripping portions of the fingers disengaged from the tube.

FIGS. 3 and 4 illustrate another embodiment of the coupling device according to the present invention which includes several modifications with respect to the embodiment depicted in FIGS. 1 and 2. In this embodiment, the same reference numerals have been utilized to indicate like components, with the exception that a prime (') has been included for those components illustrated in FIGS. 3 and 4 which have been modified.

Figure 11:
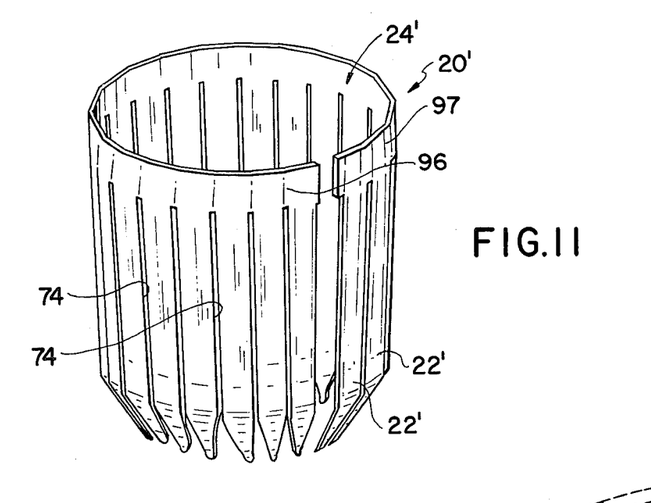
FIG. 11 is a perspective view of the metallic retaining ring manufactured in accordance with the method of the present invention.

Referring to the modified retaining ring 20' shown in FIGS. 3 and 4, it is first to be noted that the retaining ring 20' is completely self-supporting within the opening 18'. In other words, no shoulder is formed between the ring portion 24' and the depending fingers 22' which is adapted to rest on and engage a complimentary shoulder formed in the side wall defining the opening 18'. Thus, the outer surface of ring portion 24' is coextensive with the outer surface of the fingers 22' at the upper end thereof, as best seen in FIGS. 3, 4, and 11. The manner in which the retaining ring 20' is supported in the opening 18' and the method of manufacture of same will be more fully disclosed hereinbelow with reference to FIGS. 6-13.

In addition, each of the fingers 22' of the modified retaining ring 20' includes a first gradually inclined portion 34' extending downward from the ring portion 24' and a second inclined tip portion 32' inclined with respect to both the first portion 34' and the ring portion 24'. The gradual inclined portion 34' serves to direct the tips 26' inwardly to grippingly engage the tube 10 and serves to provide the inwardly directed biasing force for the fingers 22' to cause the gripping tips 36' to engage the tube 10. On the other hand, the second inclined tip portions 32' provides a surface which is engagable by the unlocking collar 36' for the purpose of transmitting the axially directed unlocking force to move the gripping tips 26' radially outward to release the tube 10 from gripping engagement. As best seen in FIG. 4, the lower end 40' of the unlocking collar 36 only engages the second inclined tip portion 32' and slides downwardly therealong as the unlocking collar 36' is moved axially downward to unlock the gripping tips 26'. During this unlocking movement, the lower end of the first inclined portion 34' is moved radially outward to be almost coextensive with the outer surface of the ring portion 24'. This outward movement is limited by a shoulder 47' machined at the lower end of the opening 18' which is engagable with the lower ends of the fingers 22' so to prevent overstressing. This in turn insures that the fingers 22' will return to a gripping position when the unlocking collar 36' is released upwardly.

Turning now to the modified unlocking collar 36' shown in FIGS. 3 and 4, it is to be noted that the dimple 52' along the inside surface of the unlocking collar 36' which serves to form a seal between the tube 10 and the unlocking collar 36' is defined by two gradual and oppositely inclined surfaces 60', 62' at the lower end thereof. In this embodiment, the inclined surfaces 60', 62' extend completely around the circumference of the unlocking collar 36' at a fixed axial elevation so that the elevation of the sealing dimple 52' is not tilted at an angle relative to the axis of the unlocking collar 36'. The lower surface 62' extends radially outward to define the lower, rounded end 40' of the unlocking collar 36', and is adapted to engage the second inclined tip portion 32' of the retaining ring. This is convenient in that the sealing dimple 52' is formed near the lower end of the unlocking collar 36', and further in that the unlocking collar 36' only engages the second inclined tip portion 26' and not the gripping tips 26' themselves during downward unlocking movement which might otherwise damage the gripping tips 26'.

The improved retaining ring 20' having axially extending inwardly biased fingers 22', as shown in FIGS. 3 and 4, is manufactured in accordance with another aspect of the present invention which results in a significant cost savings for the finished retaining ring 20'. In the prior art, metallic retaining rings would generally be manufactured by first forming a cup-shaped member from a metal blank, such as for example, by drawing, bending or peening the metal. After this step, the bottom and portions of the sides of the cup-shaped member were then cut or punched to form a ring-shaped member having depending fingers. The fingers could then be bent inwardly to bias same radially inward, or, if the sides of the cup-shaped member were initially sufficiently inclined, no further bending was necessary. As can be appreciated, there was substantial waste of metal with such a manufacturing process. In fact, it has been found that such method resulted in 75% waste, the weight of the formed retaining ring only comprising 25% of the weight of the blank from which it was formed. However, with the method of the present invention, only approximately an additional 20% of the finished weight of the metallic retaining ring is necessary for manufacture. This is significantly less than the additional 300% of the finished weight of metal which is required with the prior art.

Figure 6:
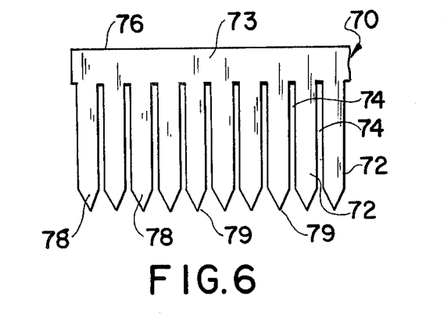
FIG. 6 is a plan view of a portion of a metallic plate which has been cut, in accordance with one step of the method of the present invention of manufacturing a retaining ring for a tube.

According to the method of manufacturing of the present invention, a flat metal blank 70 is first cut to form a plurality of elongated fingers 72 extending from and integral with an upper web portion 73, as shown in FIG. 6. This cutting can be accomplished for example, by cutting or punching with conventional metal cutting tools or dies, a plurality of substantially parallel grooves 74 which extend from one edge 75 of the metal blank 70 inwardly towards the opposite edge 76 but not across the full width of the blank 70. Also, in the preferred embodiment, the tips 78 of the formed elongated fingers 72 have been cut to form a substantially pointed end, as at 79. These tips 78 will form the gripping tips of the finished retaining ring 20'. As can be seen from FIG. 6, because of the closeness between adjacent fingers 72, the only waste comprises the metal cut from the grooves 74. As noted above, this waste is on the order of only 20% of the surface area remaining after cutting.

Figure 7:
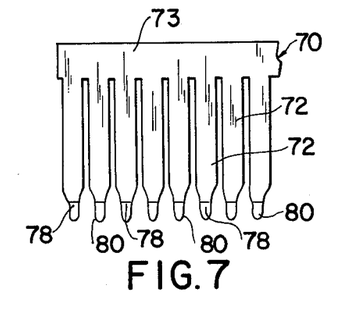
FIGS. 7 and 7a are a plan view and a side view respectively showing the tips of the fingers flatten, in accordance with another step of the method of the present invention.
Figure 7A:
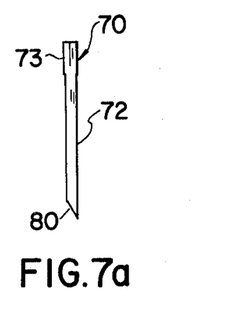

Next, referring to FIGS. 7 and 7a, the pointed tips 78 of the formed elongated fingers 72 are flattened, such as for example by peening or by compressing such tips between a pair of die members, so that the thickness of the metal blank 70 at the tips 78 is much thinner than the remainder. This flattening step rounds and expands the surface area of the tips, as shown at 80, and serves to provide sharp edges on the fingers 72 for gripping purposes.

Figure 8:
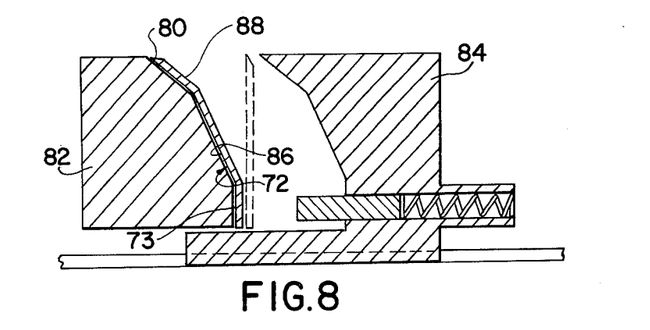
FIG. 8 is a schematic diagram illustrating bending of the fingers formed in the metallic plate shown in FIGS. 6 and 7 relative to the web portion in accordance with another step of the method of the present invention.

Next, referring to FIG. 8, the cut and pressed metal blank 70 is fed to a bending station comprised of male and female die members 82, 84 respectively, which serves to bend or enclose the fingers 72 out of the plane of the flat web portion 73. The blank 70, prior to bending, is shown in dotted outline in FIG. 8. At the bending station, the web portion 73 of the metal blank 70 remains flat, and the portion 86 of the fingers 72 integral with and depending from the web portion 73 are bent or inclined gradually with respect to the flat surface of the web portion 73. Upon continued action of the dies 82, 84 toward one another, the ends 88 of the fingers 72 are further inclined with respect to the portion 86 and the web portion 73. The precise shape of the metal blank 70 when it leaves the die members 82, 84 is shown in solid outline in FIG. 8 and corresponds to the cross section of the retaining ring 20' shown in FIGS. 3 and 4—namely, portions 86 and 80 corresponding to inclined portions 34' and 32' respectively. It is to be noted that in practice, the cutting, flattening, and bending of the metal blank 70, as shown in FIGS. 6, 7, and 8, can take place in sequence with a continuous strip of metal, which is then severed into appropriate lengths prior to the next bending operation.

Figure 9:
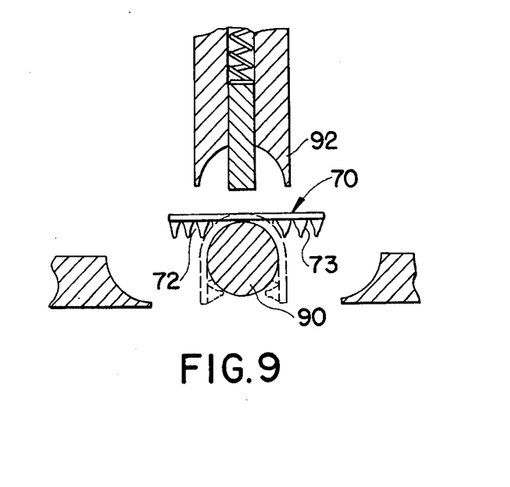
FIGS. 9 and 10 show schematically the bending of the web portion of the metallic plate about a circular form to produce the metallic retaining ring in accordance with the method of the present invention.
Figure 10:
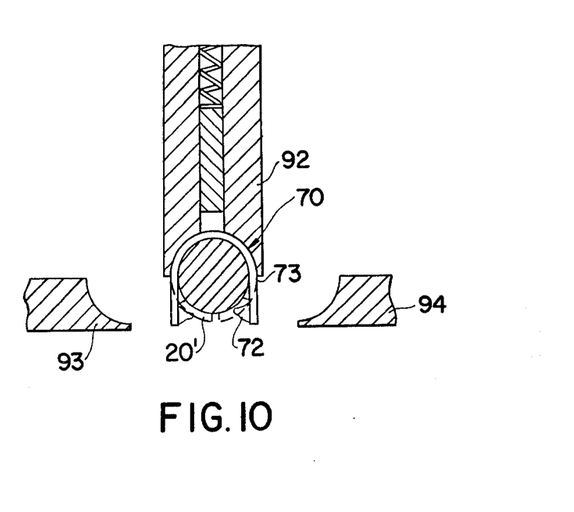

After the fingers 72 are inclined with respect to the flat web portions 73, the metal blank 70 is delivered to a bending or forming station which is represented schematically in FIGS. 9 and 10. There, the metal blank 70, whose length corresponds substantially to the circumference of the finished metallic retaining ring, is first folded or bent about its mid-point around a substantially circular male die member 90 by means of a female die member 92 to bend the web portion 73 into a U-shaped cross section, as shown in dotted outline in FIG. 9. During this bending operation, the inclined fingers 72 are directed downwardly and under the male die 90. Thus, only the web portion 73 of the metal blank 70 is folded around the circular male die member 90. After the web portion 73 is formed into the U-shaped cross section, two side female members 93, 94 complete the bending or folding of the ends of the metal blank 70 about the circular male die member 90, as shown in dotted outline in FIG. 10, so that the web portion 73 has a substantially circular cross section.

The finished retaining ring 20' is shown in perspective in FIG. 11, the web portion 73 corresponding to the ring portion 24', and the fingers 72 corresponding to the fingers 22'. As noted, during the final folding operation about the circular die member 90, the web portion 73 of the metal blank 70 takes on a substantially closed circular shape. However, in actuality, this closed circular shaped web portion 24' is comprised of a plurality of substantially straight sides 96 which are folded or bent as at 97, at various places about the circumference of the finished ring 20'. In other words, instead of forming a smooth circular outline, the web portion 24' is actually polygonal in shape. As seen in FIG. 11, the sides 96 of the web portion 24' define a plurality of corners 97 which lie directly in line with the grooves 74 formed between adjacent fingers 22' depending axially downward from the web portion 24'. This results from the fact that the integral connection of the fingers 22' to the web portion 24' provides a substantially stronger resistance to bending than is provided above the grooves 74 between adjacent fingers 22'. Thus, during the bending about the circular male die member 90, bending of the web portion 73 occurs in the less resistant areas aligned with the grooves 74, thereby resulting in a polygonal cross section for the finished retaining ring 20'.

Figures 12, 13:
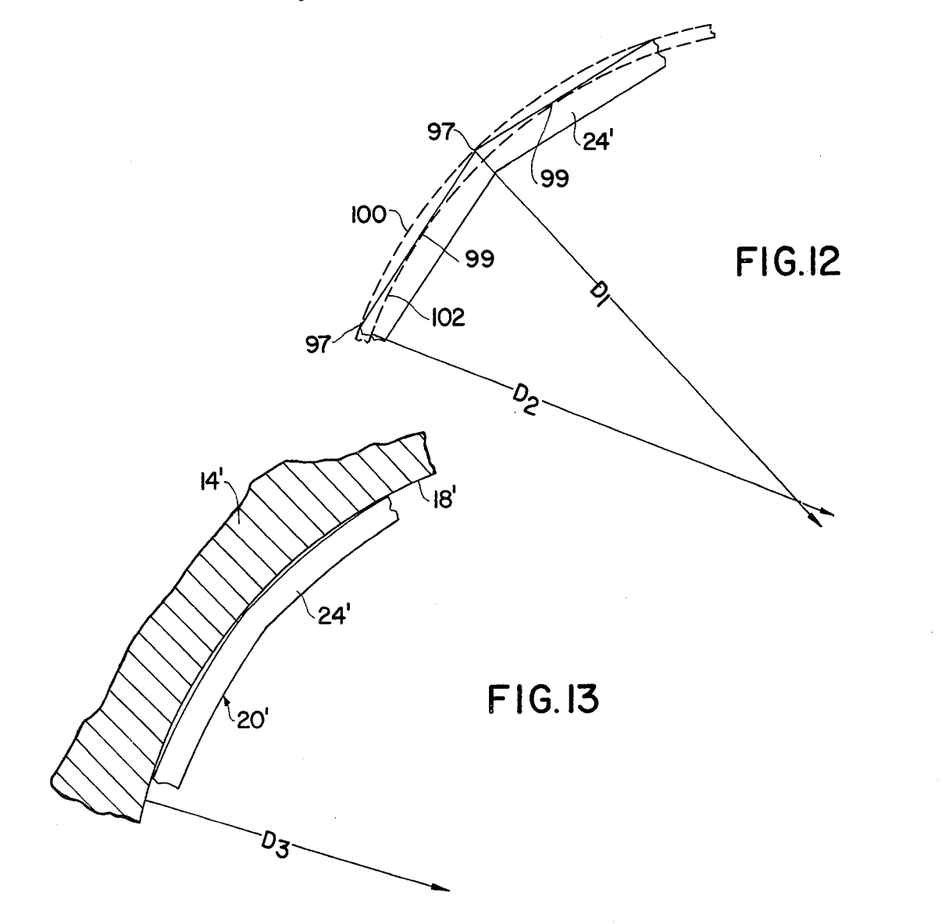
FIG. 12 is a greatly enlarged top view of a portion of the retaining ring manufactured in accordance with the method of the present invention illustrating the shape of the web portion.
FIG. 13 is a partial sectional view taken along lines 13—13 of FIG. 3 showing a portion of the improved retaining ring of the present invention supported within the opening of the fitting.

This shape for the web portion 24' is particularly advantageous in order to provide a self-supporting retaining ring. As particularly shown in FIG. 12, an imaginary circle 100 having a diameter $D_1$ can be defined with passes through the outside corners 97 of the web portion 24'. The diameter $D_1$ is greater than the diameter $D_2$ of another imaginary circle 102 which passes through the mid-points 99 of the outside surfaces forming the straight sides 96 of the web portion 24'. If the diameters $D_1$ and $D_2$ of the circle 100 and 102 respectively are such that the diameter $D_1$ is greater than the inside diameter $D_3$ of the opening 18' in the fitting 14', and the diameter $D_2$ is less than the diameter $D_3$ of the opening 18', the retaining ring 20' will be self-supporting when it is placed within the opening 18'. In order to insert the retaining ring 20' into the opening 18', the corners 97 of the web portion 24' of the ring 20' must be compressed inwardly. This in turn causes the web portion 24' to distort slightly so that the mid-points 90 of the sides 96 are bowed slightly outward. In other words, to insert the retaining ring 20' into the opening, the web portion 24' must be temporarily forced into a more circular shape. As the web portion 24' tends to want to return to its original polygonal shape, the corners 97 exert a force radially outward which is sufficient to hold the retaining ring 20' in axial position within the opening 18' once it is set into place. The difference between the diameter $D_1$ of the imaginary circle 100 passing through the corners 97 and the inside diameter of $D_2$ of the opening 18' need only be on the order of 0.001–0.004 inch when the diameter $D_3$ is on the order of 0.5 inches. Thus, the radial compression which forces the retaining ring 20' into more circular shape serves to lock the ring 20' into axial position within the opening 18'. Further, it should be noted that the force exerted by the corners 97 will be more evenly distributed about the circumference of the opening 18' as the member of sides 96, and thus the number of corners 97, increases. In this regard, it should be noted that the number of sides 96 is increased by increasing the number of fingers 22' for the retaining ring 20'. For example, it has been found desirable to utilize a retaining ring 20' having at least 8 fingers 22' and more preferably at least 16, as, for example, shown in FIG. 11. Therefore, it is not necessary to provide complimentary shoulders formed in the opening 18' and on the retaining ring 20'. This relatively large number of fingers 22' in close proximity to one another also serves to provide an almost solid gripping ring which thus provides increased gripping action to hold the tube 10'.

Figure 5:
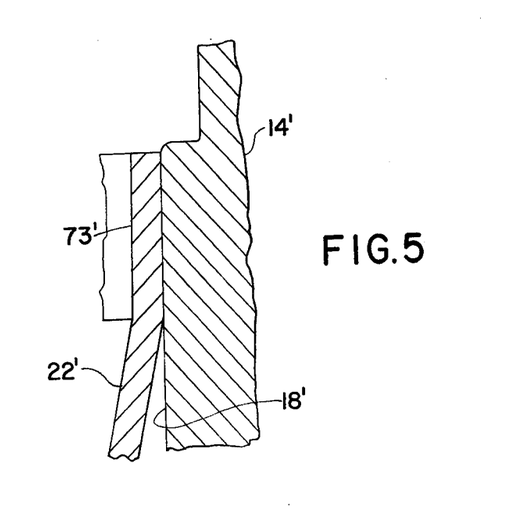
FIG. 5 is a longitudinal sectional view of the retaining ring supported in the opening of a fitting which is similar to but slightly modified from that shown in FIG. 3.

In practice, once the retaining ring 20' is inserted into the opening 18', a lip 106, machined in the surface of the opening 18', is swaged radially inward to prevent the retaining ring 20' from being moved out of the opening 18'. However, this lip 106 is not necessary as the radially outward force of the corners 97 is sufficient to prevent normal withdrawal of the retaining ring 20'. Such an arrangement is shown in FIG. 5.

Thus, it is seen that the present invention provides a coupling device 12 for a fluid conduit or tube 10. The tube 10 is inserted through a force actuating ring 42 and unlocking collar 36, (which have been force-fitted together) into an opening 18 in the fitting 14 of the coupling device 12. The end of the tube 10 is forced downwardly through a raised dimple portion 52 on the inside surface of the unlocking collar 36, and below gripping portions 26 on the fingers 22 of a retaining ring 20 in opening 18. The fingers 22 are normally radially inwardly biased so that the gripping portions 26 directly hold and restrain the tube 10 against axial movement out of the fitting 14. However, when it is desired to remove the tubing 10 from the fitting 14, the force actuating ring 42 is depressed downwardly, and by virtue of its connection to the unlocking collar 36, forces the unlocking collar 36 to also move axially downward. The lower end 40 of the unlocking collar 36 engages the inclined surfaces 32 of the fingers 22 and forces the fingers 22 radially outward to release the gripping portions 26 from engagement with the tube 10. While the unlocking collar 36 is maintained in its downward position, the tube 10 may simply be withdrawn from the fitting 14. When the tube 10 is in its inserted or coupled position, the O-ring 50 and raised dimple 52 serve to prevent any leakage of fluid between the bore 16 of the fitting 14 and the exterior of the tube 10.

Further, according to another aspect of the present invention, there is provided an improved method of manfacturing a retaining ring 20' having a plurality of axially extending inwardly biased gripping fingers 22' for a tube 10. According to the improved method, a flat metal blank 70 is first cut to form a flat web portion 73 and a plurality of substantially parallel elongated fingers 72 depending from and integral with such flat web portion 73. Next, the fingers 72 are bent out of the plane of the web portion 73 so that at least a portion of each of the fingers 72 is inclined with respect to the surface of the web portion 73. Finally, the web portion 73 forms a substantially closed ring with the inclined portions 86, 88 of the fingers 72 directed inward relative to the circular shaped web portion 73 to produce the finished retaining ring 20'.

Still further, the present invention provides an improved retaining ring 20' for a releasable coupling device 12' of the type in which the coupling device includes a fitting 14' having a bore 16' therein, and an opening 18' into the bore through which a tube 10 is to be inserted, a retaining ring 20' in the opening having a plurality of axially extending inwardly biased fingers 22' adapted to engage the tube when the tube is inserted into the fitting towards the bore, and unlocking means 36' for forcing the plurality of fingers 22' radially outward to cause disengagement of the fingers 22' from the tube 10. The improved retaining ring 20' comprises a multi-sided web portion 24' having the plurality of fingers 22' depending therefrom, the sides 96 of the web portion 24' defining a plurality of corners 97. The corners 97 are such that the diameter $D_1$ of an imaginary circle 100 passing through the corners 97 is greater than the diameter $D_3$ of the opening 18' and the diameter $D_2$ of an imaginary circle 102 passing through the mid-point of the sides 96 of the web portion 24' is less than the diameter $D_3$ of the opening 18'. In this way, the retaining ring 20' may be supported solely within the opening 18' by the engagement of the corners 97 against the side walls of the opening 18' without the necessity of complimentary shoulders formed on the retaining ring and the opening.

While the preferred embodiment of the present invention has been shown and described, it will be understood that such is merely illustrative and that changes may be made without departing from the scope of the invention as claimed.

What is claimed is:

1. A releasable coupling device for a tube, said releasable coupling device comprising: a fitting having a bore therein and an opening into the bore through which the tube is to be inserted, the internal diameter of said opening being greater than the diameter of said bore; a retaining ring in said opening having a plurality of axially extending, inwardly biased fingers adapted to engage said tube when said tube is inserted into said fitting towards said bore so that said tube is restrained against axial movement out of said fitting; unlocking means for forcing said plurality of fingers radially outward to cause disengagement of said fingers from said tube; and wherein said retaining ring comprises a multi-sided web portion having said plurality of fingers depending therefrom, adjacent sides of said web portion defining a plurality of conrners, the diameter of an imaginary circle passing through said corners being greater than the diameter of said opening before said retaining ring is inserted in said opening and the diameter of an imaginary circle passing through the mid-point of said sides being less than the diameter of said opening before said retaining ring is inserted in said opening whereby said retaining ring may be support solely within said opening by the engagement of said corners against the side wall of said opening when said retaining ring is inserted into said opening.

2. The releasable coupling device of claim 1 wherein the number of sides of said multi-sided web portion corresponds to the number of fingers depending therefrom.

3. The releasable coupling device of claim 2 wherein the number of sides of said multi-sided web portion is at least 8.

4. The releasable coupling device of claim 3 wherein the number of sides of said multi-sided web portion is at least 16.

5. The coupling device of claim 1 wherein each of said fingers depending from said web portion is inclined relative to said web portion so that the ends of said fingers remote from said web portion are directed inwardly of said web portion.

6. The releasable coupling device of claim 1 wherein the difference between said diameter of said circle passing through said corners and said diameter of said opening is between 0.001–0.004 inches.

7. The releasable coupling device of claim 1 wherein said multi-side web portion is discontinuous.

8. The releasable coupling device of claim 1 wherein said plurality of fingers depend longitudinally from said web portion and wherein at least a longitudinal portion of each of said depending fingers is substantially flat along the longitudinal length of said longitudinal portion.

* * * * *

UNITED STATES PATENT AND TRADEMARK OFFICE
CERTIFICATE OF CORRECTION

PATENT NO. : 4,440,424
DATED : April 3, 1984
INVENTOR(S) : Paul Mode

It is certified that error appears in the above-identified patent and that said Letters Patent are hereby corrected as shown below:

Column 14, line 7, "conrners" should read --corners--.
Column 14, line 29, after "The" insert --releasable--.
Column 14, line 39, "multi-side" should read --multi-sided--.

Signed and Sealed this

Sixteenth Day of October 1984

[SEAL]

Attest:

GERALD J. MOSSINGHOFF

Attesting Officer

Commissioner of Patents and Trademarks